July 31, 1956 A. V. BEDFORD 2,757,236

VERTICAL APERTURE COMPENSATION FOR CATHODE RAY APPARATUS

Original Filed July 24, 1950 5 Sheets-Sheet 1

INVENTOR
Alda V. Bedford
BY
ATTORNEY

VERTICAL APERTURE COMPENSATION FOR CATHODE RAY APPARATUS

Original Filed July 24, 1950 5 Sheets-Sheet 2

INVENTOR
Alda V. Bedford
BY
ATTORNEY

VERTICAL APERTURE COMPENSATION FOR CATHODE RAY APPARATUS

Original Filed July 24, 1950

INVENTOR
Alda V. Bedford
BY
[signature]
ATTORNEY

INVENTOR
Alda V. Bedford.
BY [signature]
ATTORNEY

INVENTOR
Alda V. Bedford
BY
ATTORNEY

United States Patent Office 2,757,236

Patented July 31, 1956

2,757,236

VERTICAL APERTURE COMPENSATION FOR CATHODE RAY APPARATUS

Alda V. Bedford, Princeton, N. J., assignor to Radio Corporation of America, a corporation of Delaware Continuation of application Serial No. 175,496, July 24, 1950. This application August 1, 1955, Serial No. 525,648

29 Claims. (Cl. 178—7.5)

This invention relates to television and/or facsimile systems. More particularly, it pertains to the compensation of subject-representative signals for effective aperture loss in a vertical direction.

This application is a continuation of my application, now abandoned, Serial No. 175,496, filed July 24, 1950, and titled "Picture Signal Compensation Apparatus."

Resolution of a pictorial representation such as a television picture is, in part, a function of the effective aperture of the video signal generating and/or reproducing apparatus. This is true irrespective of the type of camera or pick-up apparatus and/or image reproducing device used. In the types of such apparatus presently employed in most systems, the effective apertures of the pick-up and reproducing devices are defined by the spot sizes of the respective electron beams used to scan the target electrodes of these devices. It is desirable to make the effective aperture or spot size as small as practicable in order to convey a maximum of picture detail information.

Numerous systems using electrical filters have been devised and used to compensate for effective aperture loss in the direction of line scanning, which usually is the horizontal direction. However, it heretofore has not been deemed practical to attempt any compensation for effective aperture loss in a vertical direction because a similar method is not effective. It is apparent, nevertheless, that a material improvement in picture resolution may be achieved by minimizing such vertical aperture loss.

It, therefore, is an object of this invention to improve picture resolution in a direction perpendicular to the scanning lines by compensating for effective aperture loss in this direction.

Another object of the invention is to modify the subject-representative signals in a manner to compensate for the effect of spot size upon picture resolution.

Still another object of the invention is to develop video signals for use in a television system in which an image is reproduced in successive fields having interlaced horizontal lines so as to compensate for effective aperture loss in a vertical direction.

According to this invention, the effective aperture loss in a vertical direction is minimized by developing a compensated subject-representative signal. A compensated signal is produced, in accordance with this invention, by effectively combining in a suitable manner the information derived from the scanning of each raster line with the information derived from the scanning of vertically adjacent picture areas, e. g., the immediately preceding and immediately succeeding scanning lines. In one illustrative embodiment of the invention, the compensation of the subject-representative signal comprises delaying or storing it to form two different signal components. One of the stored signals is delayed for a time equal substantially to the time required to scan one-half line less than one of the interlaced fields. The second stored video signal is delayed for a time substantially equal to that time required to scan one-half line more than one of the interlaced fields. The two delayed signals then are combined with the undelayed video signal in predetermined polarity and magnitude to produce the compensated video signal. This latter signal then is in a suitable form to control the operation of an image-reproducing device.

More specifically, the herein illustrated embodiment of the invention comprises, in addition to the signal delaying means, apparatus for reversing the polarity of the two delayed signal components relative to the undelayed signal. Also, the delayed signals are attenuated or decreased in magnitude before being combined with the undelayed signal.

It will be understood that the invention may be embodied in the herein illustrated or other forms in either the transmitting or receiving apparatus. In most cases, it probably is preferable to incorporate the invention in the transmitting station apparatus. In this way it will not be necessary to modify the design or otherwise change the receiving apparatus.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figures 1*a* to 1*e*, inclusive, are graphical representations of the manner in which the present invention improves the television picture resolution under one set of conditions;

Figures 2*a* to 2*e* inclusive, also graphically illustrate the manner in which the present invention effects improved picture resolution under a somewhat different set of conditions;

Before describing in detail the apparatus embodying this invention, a brief description of the way in which vertical aperture loss arises will be given with reference to Figures 1*a* to 1*c* inclusive. It is assumed in Figure 1*a* that the subject matter of the image to be reproduced changes from gray to white between two successive horizontal scanning lines. In order to simplify this graphical showing of the effective aperture loss, the picture brightness is assumed to vary vertically in the figure. Likewise, the successive horizontal lines are shown in a vertical sense in the figure and are assumed to have the widths indicated. The trace 11 represents picture black. Similarly, the traces 12 and 13 represent respectively gray and white shades of the picture. It is assumed that the picture changes from gray to white between the scansion of horizontal lines 3A and 4A. Accordingly, the trace 14 represents the brightness change between these two lines.

Figure 1A:
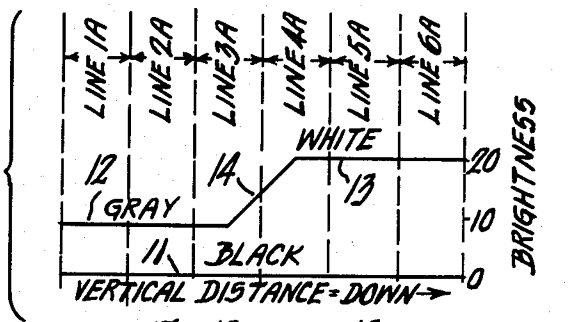
Figure 1B:
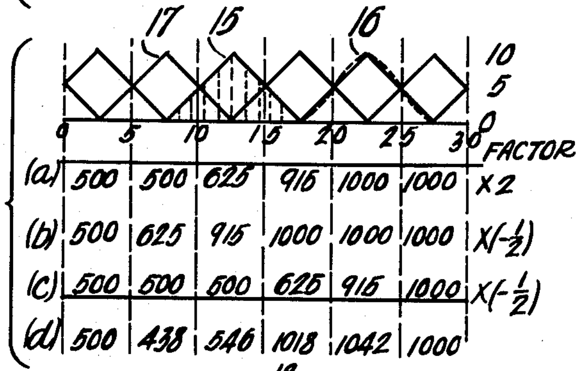

Figure 1*b* shows the distribution of the effectiveness of the aperture or spot in the television camera or pick-up apparatus. If, for example, the television subject is in the form of a motion picture film, a flying spot type of signal-generating or pick-up device may be used. In such a case, each one of the inverted V-shaped curves, such as 15 for example, represents a plot of the light which would be passed by a narrow horizontal slit as it is moved across the spot in a direction at right angles to the scanning lines. It is seen that the spot is twice as wide as each one of the horizontal lines scanned. Therefore, overlap of the spots occurs as illustrated. It will be understood that the light distribution will not necessarily be in accordance with the straight line showing used here for the purpose of simplicity. Generally, in practice the light distribution in the spot of a cathode ray tube is more accurately depicted by a cosine squared curve as shown by the broken line curve 16. For a more detailed description of the cosine squared and other types of spots and their effects upon the picture resolution refernce may be made to an article by R. D. Kell, A. V. Bedford and G. L. Fredendall, entitled "A determination of optimum number of lines in a television system," published in the RCA Review of July 1940.

Considering the hypothetical case still further, it will be seen that the output voltage representing the video signal for any horizontal scanning line is proportional to the summation of the response or effectiveness of the spot as shown by one of the inverted V-curves, such as 15 of Figure 1*b*, multiplied by the brightness of the subject as shown by the curve of Figure 1*a*. For the purpose of concreteness, suitable arbitrary values have been given to the curves of Figures 1*a* and 1*b*. Using these values it is seen that, when the picture line 2*a*, for example, is scanned, the video signal is proportional to the area under the inverted V-curve 17, multiplied by the value of the trace 12 representing picture gray. In the assumed case, the output video signal, therefore, is proportional to 50 times 10 which is 500. This and other similar values are tabulated in line (A) immediately below Figure 1*b*. The columns of figures are arranged directly in line with the horizontal scanning lines to which they pertain. The video signal representing picture line 3A in which the spot represented by the inverted V-curve 15 is split over both the uinform gray area represented by the trace 12 and the area which is changing from gray to white represented by the trace 14 of Figure 1*a* may be calculated by a somewhat different process. With sufficient accuracy for the present purpose this calculation may be made by dividing the area under the curve 15 into several, for example 10, vertical strips substantially as shown by the broken lines under this curve. The area of each of these strips may be multiplied by the corresponding ordinate of the curve of Figure 1*a*. In the present case, the sum of these products is 625 for the picture line 3A. This also is recorded in line (*a*) of the table.

Similar computations may be made for the other lines of the picture. For lines 4A and 5A, for example, the video signal is calculated to be proportional to 915 and 1000, respectively, as tabulated.

The light distribution produced by a video signal having the values appearing in line (*a*) of the table accompanying Figure 1*b* depends upon the light distribution of the spot in the image-reproducing device. The effect of such a signal upon the reproduced image is shown graphically in Figure 1*c*. It is assumed that the light distribution of the spot in the image-reproducing device is the same as that of the signal-generating or pick-up device. The inverted V-curves of Figure 1*c* have peak values corresponding to the values in line (*a*) of the table. The light produced by the overlapping spots for the transition from gray to white of the subject is shown by the broken line curve 18. The solid line curve 19 has been drawn by inspection to represent generally the equivalent linear transition from gray to white. It is seen that it has a rise distance of approximately 2.4 times the distance between adjacent horizontal scanning lines.

Figure 1C:
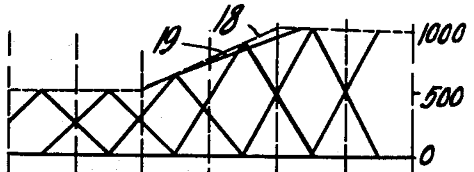

A comparison between Figures 1*a* and 1*c* readily shows the effect of aperture loss upon the vertical resolution of the reproduced image. In the original subject the rise distance of the trace 14 between gray and white brightness values is equal to the distance between the scanning lines. To effectively spread the transition from gray to white over approximately 2½ scanning lines as shown in Figure 1*c* materially decreases vertical resolution.

Having in mind the general nature of the problem to be solved in order to improve resolution in the vertical direction of a television image, reference now will be made to Figure 3. There are shown the components of that part of a television system necessary to develop the compensated video signals in accordance with one embodiment of this invention. Since the invention may be embodied in the apparatus either at the transmitter or at one of the receivers, specific reference to either type of apparatus will be avoided in the following description. There is provided a video signal source 21. This may be the camera or other pick-up apparatus used at a transmitting station. Alternatively, it may be the signal-receiving portion of image-reproducing apparatus. In any case, the video signals derived from the source 21 are conventional. They are of the type which may be impressed upon an image-reproducing device in successive fields having interlaced horizontal lines. There is coupled to the video signal source 21 a delay device 22. It is the function of the delay device 22 to delay the video signals for a time substantially equal to that required to scan one-half line less than one of the interlaced fields. The character of the delay device, so far as the broad aspects of the present invention are concerned, is immaterial. If desired, it may be formed of lumped circuit elements constituting a delay network of the usual inductive capacitive type. In most cases, it may be that a delay device of this character will be found to be somewhat impractical. Not only is a delay of the order of 1/60th of a second required, but also the video signals having frequency components as high as 4 megacycles must be suitably delayed without frequency discrimination. Nevertheless, for the present purpose it will be assumed that a suitable device is employed to effect the necessary video signal delay.

The output of the delay device 22 is coupled to a second delay device 23. This device is required to effect a time delay equal to that only required to scan one horizontal line. As an alternative, however, the delay device 23 may be coupled directly to the output of the signal source 21. In such a case, the delay device is required to delay the signals for a time substantially equal to that required to scan one-half line more than one field. The delay devices 22 and 23 are coupled respectively to polarity reversers 24, 25. The function of these components is to change the polarity of the delayed video signals relative to the signals as derived from the source 21. A suitable polarity reversing device for use in this embodiment of the invention is a conventional electron tube. In such a case, only that property of the electron tube to develop signal voltages in its output circuit of opposite polarity to those impressed upon its input circuit is required. Signal amplification may or may not be desired, depending upon the type of delay devices used.

The polarity reversers 24 and 25 are coupled respectively to attenuators 26 and 27. The purpose of the attenuators is to suitably reduce in magnitude the delayed video signals of reversed polarity. Accordingly, it is desirable that the attenuators 26 and 27 be made adjustable in order that the amplitude of the delayed signals derived therefrom may be suitably varied.

The attenuators 26 and 27 and also the video signal source 21 are coupled to a signal mixer 28. This device may be of conventional construction. A typical mixer is embodied in any television transmitter for mixing video, blanking and synchronizing signals. In the mixer the delayed signals are effectively subtracted from the undelayed signals derived from the source 21. Consequently, the signal derived from the output signal of the mixer 28 is a modified video signal which is compensated suitably to overcome the effective aperture loss in a vertical direction.

Before continuing with a further description of additional details of the illustrative embodiments of the invention, reference again will be made to the explanatory curves, particularly those shown in Figures 1*c*, 1*d* and 1*e*. First, however, there will be considered quantitively the modification of the video signals as a result of the operation of the apparatus shown and described in connection with Figure 3. It should be kept in mind that this compensated video signal is substantially the original signal diminished by smaller quantities of the same signal which have been shifted in time to correspond to the scanning of the adjacent lines. In the first step to determine the values of the compensated video signals for the different lines of the image considered in the figures, the values given in line (*b*) of the table accompanying Figure 1*c* are the same as those in line (*a*) except that they are shifted one column to the left. This shift corresponds substantially to the delay of these signals by a time substantially equal to that required to scan one line less than one complete field. Similarly, line (*c*) of the table has the same values as line (*a*) except that they are shifted one column to the right. This shift corresponds to the delay of the video signals having a time substantially equal to that required to scan one line more than a complete field.

In order to take into account the different magnitudes of the delayed and undelayed video signals and also the respective polarities thereof, it will be assumed that all of the values of the various horizontal lines of the image given in lines (*a*), (*b*) and (*c*) of the table are modified or weighted by arbitrary factors. The values given in line (*a*) of the table are multiplied by a factor of 2. The values given in lines (*b*) and (*c*) of the table are multiplied by factor of $-\frac{1}{2}$. The algebraic sum of the values given for each of the horizontal image lines, weighted in the manner described, is given in line (*d*) of the table. It will be understood that the factors by which the video signal values are modified are merely by way of example. They are not to be considered as optimum values. The factor 2 for the values of line (*a*) of the table is also chosen so that the gray and white signal levels would remain unchanged.

Figure 1D:
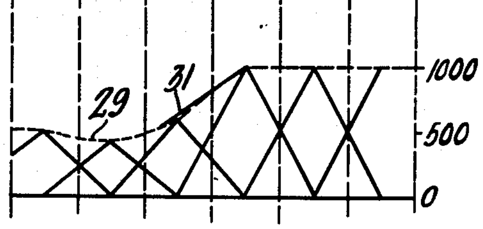

Values of the video signals indicated in line (*d*) of the table are plotted in Figure 1*d*. The total light produced by the overlapping scanning lines is indicated by the broken line curve 29. The assumed equivalent transition from gray to white is represented by the solid line curve 31. It may be seen from an inspection of the curve 31 that a material improvement has been made in the rise distance. It is now approximately 1.1 times the distance between successive horizontal scanning lines. While it still is slightly greater than the ideal rise distance of 1, it is clear that it represents a material improvement over the rise distance of 2.4 illustrated in Figure 1*c* produced without the practice of the present invention.

Figure 1E:
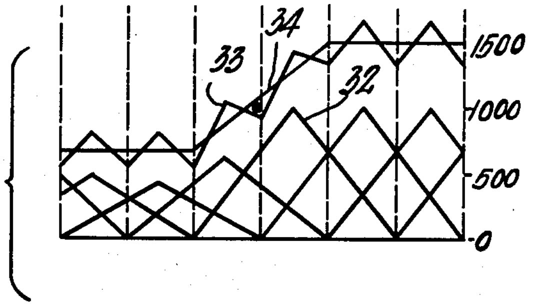
Figure 2A:
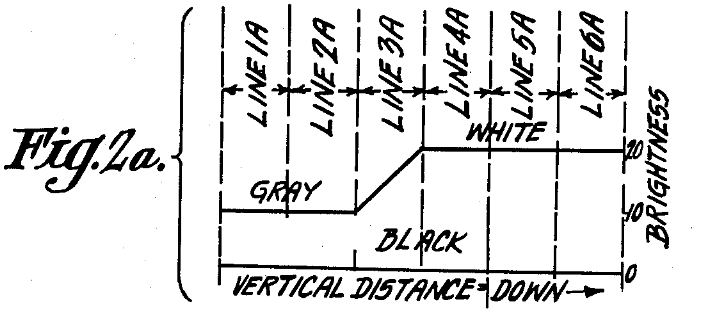
Figure 2B:
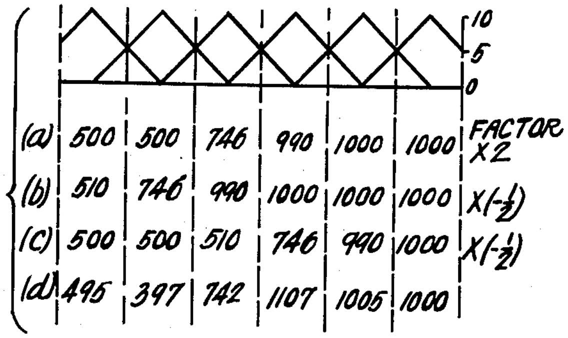
Figure 2C:
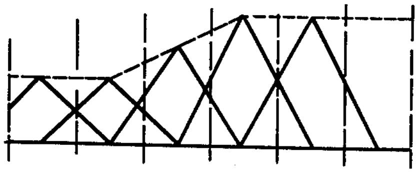
Figure 2D:
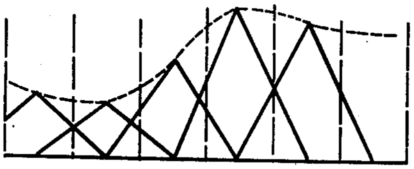
Figure 2E:
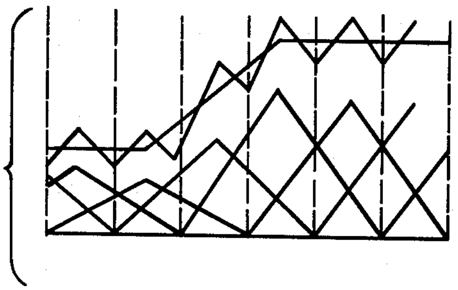

Figure 1*e* shows the results of operation when the same compensated video signals are used in a receiver in which the spot size of the cathode ray tube is three times as great as the distance between successive horizontal scanning lines. The light distribution produced by a spot of this size is shown by the inverted V curves such as 32. The curve 33 represents the sum of the outputs of the overlapping lines of the inverted V curves. It will be noted that the curve 33 is somewhat irregular even under conditions when the light from the subject is uniform. However, the amplitude of the irregularities is relatively small and in general has been found to be unobjectionable. The equivalent linear transition from gray to white is represented by the curve 34. It may be seen that the rise distance of this curve is approximately 1.8 times the distance between the horizontal scanning lines. This is not as favorable as the results shown in Figure 1*d*. However, it still is a material improvement over the results obtained by the operation of a system not embodying the invention, as shown in Figure 1*c*. This improved result is obtained despite the fact that a much smaller scanning spot is employed to produce the results shown in Figure 1*c* than that used to produce the results indicated in Figure 1*d*. It is apparent, therefore, that the invention makes it possible not only to use a considerably larger scanning spot but at the same time to effect a material improvement in vertical resolution of the reproduced image. The use of a larger scanning spot enables the production of a brighter picture. It also has the further advantage of reducing the visibility of the scanning lines.

The curves shown in Figures 2*a* to 2*e* inclusive, are similar to the corresponding curves of Figures 1*a* to 1*e* inclusive. The difference in the operating conditions is that the transition from gray to white occurs during a scanning line instead of between two successive scanning lines as assumed in the foregoing description. Further discussion of the curves of Figures 2*a* to 2*e* inclusive will not be given in view of the detailed description of Figures 1*a* to 1*e* inclusive. It merely is pointed out that the results obtained in the two cases agree reasonably well. It logically follows that transition from one image shade to another at intermediate positions will produce substantially similar results.

Reverting now to a further consideration of the apparatus by means of which to practice this invention, reference will be made to Figure 4. It is assumed that the delay device 22 of Figure 3 consists of a storage type of cathode ray tube. A suitable tube for this purpose is one which is generally referred to as the "graphechon." The essential features of a tube of this character are described in an article by L. Pensak entitled "The graphechon—a picture storage tube," published in the RCA Review of March 1949. In Figure 4, the tube 35 is a schematic illustration of one type of such a storage tube. It consists of a target electrode 36 which is of a character to store electrical charges for considerable periods of time. The target electrode 36 is charged by means of a so-called "writing" electron beam 37. This beam is produced by an electron gun 38 of somewhat conventional construction. The intensity of the electron beam 37 is modulated in accordance with the video signals derived from the source 21 in a conventional manner. The beam is deflected, also in a conventional manner, to scan a predetermined pattern or raster at the target electrode by means of horizontal and vertical deflecting coils such as 39 and 41. The deflecting coils comprise the usual yoke disposed around the envelope of the tube and are energized by conventional deflecting circuits 42.

The charges which are stored at the target electrode 36 are neutralized at some latter time by means of a "reading" electron beam 43. This beam is produced by an electron gun 44 and is deflected horizontally and vertically to scan the target electrode by deflecting coils 45 and 46. This deflecting system also is preferably energized by the deflecting circuits 42. In this way, the scanning of the target electrode by the "writing" and "reading" beams 37 and 43, respectively may be suitably coordinated. The neutralization of the charges of the target electrode 36 produces current variations in a load resistor 47 connected to the target electrode 36. The signal voltages produced in the output resistor 47 are impressed upon an amplifier 48 by which they are suitably amplified for impression upon a utilization circuit, which in this instance consists of the polarity reverser 24 and the delay device 23.

In storing and neutralizing the charges representing video signals at the target electrode 36, the "writing" and "reading" beams 37 and 43 are maintained in accurate register so far as horizontal deflection is concerned. However, the "reading" beam 43 is displaced downward in the vertical direction below the "writing" beam 37 by one scanning line. By reason of this arrangement, it is seen that the "reading" beam lags the "writing" beam by one-half line less than one complete field, when it is remembered that one field consists of a whole plus one-half lines in an interlaced system.

The delay device 23 may be another storage tube of the type described in connection with Figure 4, if desired. However, it may be formed of a conventional delay network because of the fact that the additional delay of one horizontal line is relatively short.

Figures 3, 4, 6:
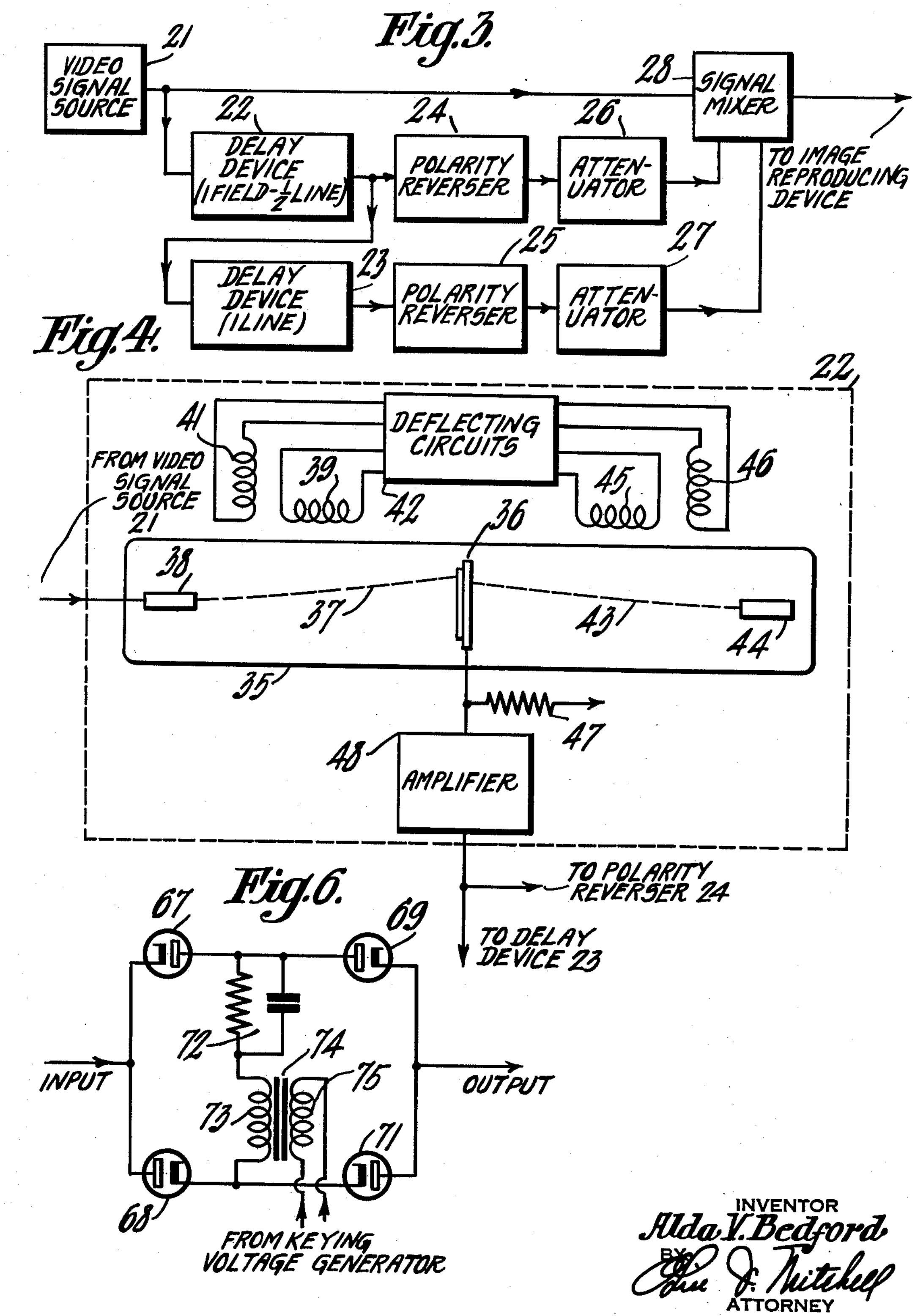
Figure 3 is a block circuit diagram of a generally illustrative embodiment of the invention.
Figure 4 is a schematic illustration of a typical signal delay device which may be used as part of the apparatus of Figure 3.
Figure 6 is a fragmentary circuit diagram of one of the components of the system of Figure 5.
Figure 5:
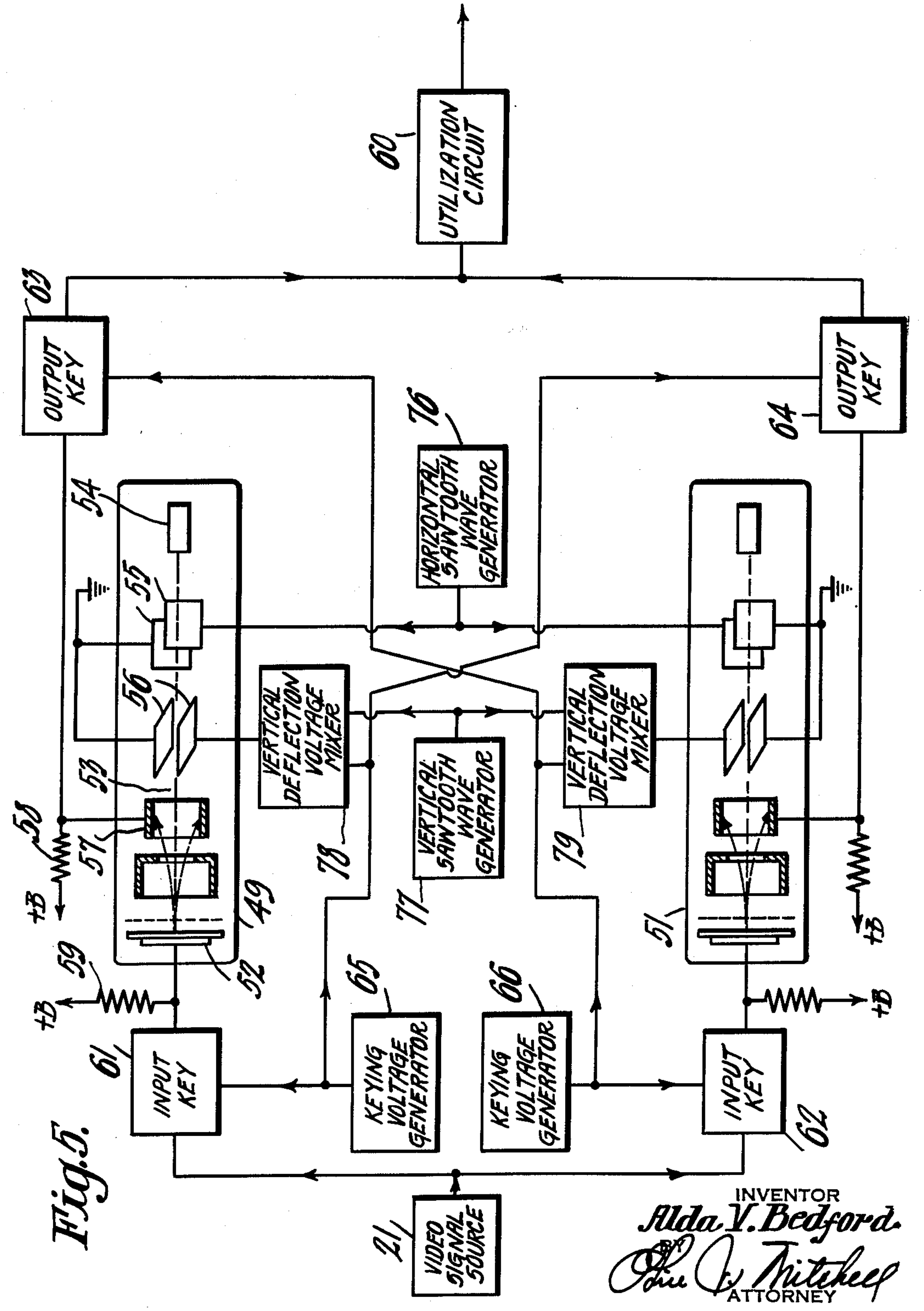
Figure 5 is a block circuit diagram of another embodiment of the invention.

When a storage tube of the type shown in Figure 4 is used to delay the video signals, it is necessary to maintain accurate registration between the writing and reading electron beams. In order to avoid such problems, another form of a storage tube of the graphechon type may be employed. Another embodiment of the invention using a modified form of storage tube is shown in Figure 5 to which reference now will be made. Before describing the details of the circuit arrangement of this form of the invention, a brief description will be given of the storage tube used.

In the form of the invention shown in Figure 5 two similar storage tubes 49 and 51 are used. Since both tubes are of similar construction only the tube 49 will be described in detail. It is provided with a target electrode 52 which is of the charge storage type capable of maintaining electrical charges impressed thereon by an electron beam 53. The electron beam is produced by a conventional electron gun 54. It is deflected over the target electrode 52 by an electrostatic deflection system including a pair of horizontal deflecting plates 55 and a pair of vertical deflecting plates 56. The tube also is provided with an electron collecting electrode 57. Suitable potentials are impressed upon the target electrode 52 and the collecting electrode 57 to cause the electron beam 53 to impinge upon the target electrode 52. A sufficient number of electrons are given up to the target electrode from the beam either to develop a charge or to neutralize one, depending upon whether the beam is writing or reading. Unused electrons from the beam 53 are returned to and collected by the electrode 57 to develop signal voltages in an output resistor 58. The signals which are to be stored by the tube 49 are developed across an input resistor 59 for impression upon the target electrode 52.

Video signals are stored by the tube 49 while signals, previously stored by the tube 51, are being derived therefrom for transfer to a utilization circuit. Switching facilities are provided for alternately connecting the storage tubes 49 and 51 to the video signal source 21 and to a utilization circuit 60 which will be understood to include apparatus such as the signal mixer 28 of Figure 3.

The video signal source 21 is coupled to the target electrodes of the storage tubes 49 and 51 by respective input keys 61 and 62. Similarly, the output or electron collecting electrodes of the storage tubes 49 and 51 are coupled to the utilization circuit 60 by respective output keys 63 and 64. The operation of the various coupling keys is controlled by a pair of keying voltage generators 65 and 66.

A typical circuit arrangement which may be used as input and output keys is shown in Figure 6 to which reference now is made. The key includes four diodes 67, 68, 69 and 71. These are arranged in a conventional bridge circuit substantially as shown. The input and output circuits for the key are coupled to one pair of conjugate terminals of the network. Interconnecting the other pair of conjugate terminals is a series circuit including a conventional resistive capacitive network 72 and a winding 73 of a coupling transformer 74. The network 72 provides a self-biasing of the diodes so that, normally the circuit between the input and output terminals is non-conductive. Winding 75 of the transformer 74 is connected to one of the keying voltage generators. Keying voltage impulses derived from the generator are impressed upon the bridge network to render it conductive for signals impressed upon the input terminal. The keying voltage impulses serve to store energy in a conventional manner in the self-biasing network 72 so that the network is maintained non-conducting between impulses.

Horizontal deflection of the electron beams of the storage tubes 49 and 51, respectively, is controlled by horizontal sawtooth wave generator 76. This generator is coupled to the horizontal deflecting plates of the respective storage tubes. Vertical deflection of the electron beams of the two storage tubes is generally under the control of a vertical sawtooth wave generator 77. However, for vertical deflection of the electron beams, components of the keying voltages derived from generators 65 and 66 are mixed with the sawtoothed waves derived from generator 77. Accordingly, the vertical sawtooth wave generator is coupled to vertical deflection voltage mixers 78 and 79 respectively associated with storage tubes 49 and 51. Also, the keying voltage generator 66 is coupled to the mixer 78. Likewise, the keying voltage generator 65 is coupled to the mixer 79. The output circuits of the mixers 78 and 79 are coupled respectively to the vertical deflecting systems of the storage tubes 49 and 51.

Figure 7:
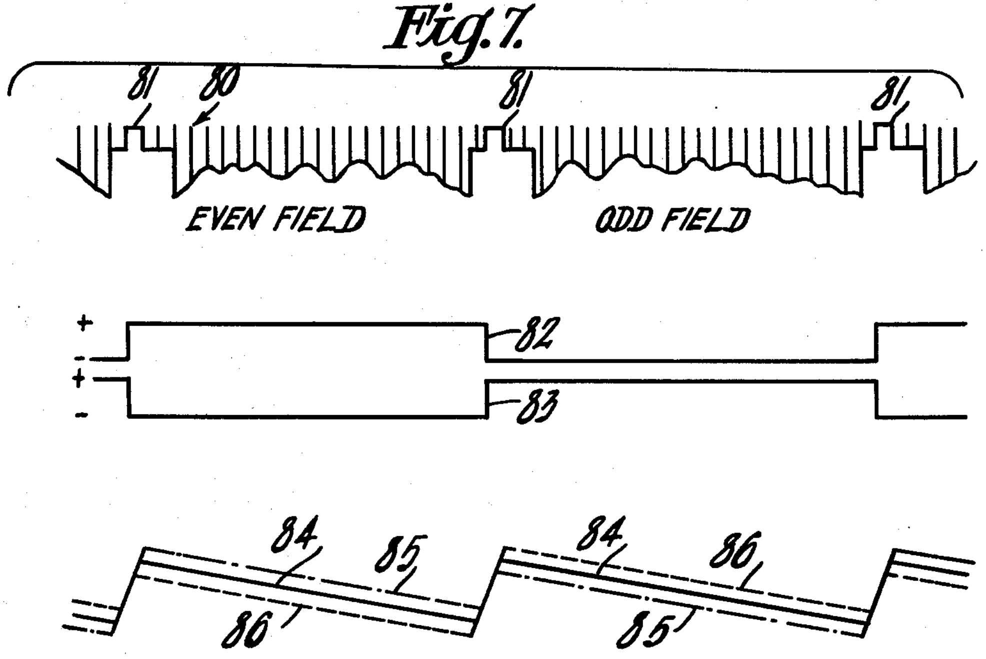
Figure 7 shows typical waveforms of signals and control voltages used in the operation of the apparatus of Figure 5.

The purpose of mixing components of the keying voltages with the vertical sawtooth waves is to effect the desired time delay of the video signals. The manner in which these time delays are produced by means of the storage tubes 49 and 51 may be better understood from the following description which is taken in conjunction with Figure 7 of the drawings. The curve 80 represents a typical composite television signal as it may appear at two successive interlaced fields. Such a wave form is conventional and is so generally familiar to those skilled in the art that detailed description thereof is considered to be unnecessary. Suffice it to state that the vertical synchronizing signals are indicated at 81. The curve 82 represents the keying voltage derived from the generator 65. Similarly, the curve 83 represents the keying voltage derived from the generator 66. The two keying voltages change abruptly in amplitude substantially coincidentally with the vertical synchronizing signals 81. Also, it is to be noted that the keying voltages are substantially 180 degrees out of phase with one another. An inspection of the curves 82 and 83 with reference to their use with the keys 61, 62, 63 and 64 of Figure 5, indicates the described manner in which the input and output keys operate.

The solid line curve 84 represents the sawtooth voltage wave derived from the vertical generator 77 of Figure 5. If such a voltage were to be used for the vertical deflection of each of the electron beams of the tubes 49 and 51, the patterns traced by the beams upon the respective target electrodes would be substantially identical to the conventional interlaced pattern comprising the usual television raster. Consider the tube 49, for example. During the odd fields, the beam 53 would scan between the horizontal lines of the even fields. A similar situation exists with respect to the tube 51.

However, by adding a portion of the keying voltage wave represented by the curve 82 to the sawtooth voltage represented by the curve 84, a sawtooth wave represented by the dot-dash curve 85 is produced. It is seen that, during the even fields of the wave 80, the values of the wave 85 are greater than those of the wave 84. During the odd fields, the values of the wave 85 are less than those of the wave 84. Thus, when the electron beam 53 of the tube 49 is deflected vertically by the wave 85, it is shifted higher than normally by a half a line during an even field which is a writing field for this tube. Also, it is shifted a half a line lower than normally during an odd field which is a reading field for this tube. In this way, the horizontal lines scanned by the beam 53 may be made to coincide in successive fields. Furthermore, it may be seen that, by reason of the upward shift of the beam during the writing fields and the downward shift of the beam during the reading fields, a storage of the video signals for a time substantially equal to one-half line less than the one field is produced.

The combination of the voltage wave represented for the curve 83 with the sawtooth wave 84 by means of the mixer 79 produces a sawtooth wave represented by the broken line curve 86. This voltage wave is impressed upon the vertical deflecting system of the tube 51. Having in mind the alternate writing and reading operation of the tubes 49 and 51, it will be appreciated that, what has been referred to as a writing field for the tube 49 is a reading field for the tube 51. It is seen that the curve 86, during the even fields of the curve 81 is less in amplitude than the curve 84. Consequently, a downward shift of the beam 51 is made during this field which is a reading field for this tube. In a like manner the amplitude of the curve 86 is greater than the amplitude of the curve 84 during the odd fields. There is produced in this manner an upward shift of the electron beam during this field which is a writing one for this tube. Thus, it is seen that the tube 51 operates to produce a delay in the video signals which is substantially equal to one-half line less than one field.

If it is desired to use apparatus of the character shown in Figure 5 for delaying the video signals for a time substantially equal to one-half line more than one field, it is necessary merely to modify the circuit connections so that a portion of the voltage derived from the generator 65 is combined with the vertical sawtooth voltage wave in the mixer 78 for use with the tube 49. Likewise, the keying voltage generator 66 would be connected to the mixer 79 for producing a suitable vertical deflection voltage for the electron beam of the tube 51.

It may be determined from the foregoing description of a number of illustrative embodiments of the invention that a substantial improvement may be made in the vertical resolution of a television picture by the use of video signals compensated by suitable modification in accordance with this invention. As a result, there may be employed electron beams for use in image-reproducing devices having greater spot sizes in the plane of the luminescent screen. By such means brighter pictures may be produced without adversely affecting vertical resolution. The use of larger receiving beam spots has the added advantage of reducing visibility of the scanning lines. It also will be apparent that the usefulness of the invention is not limited to improving vertical resolution which ordinarily is diminished by reason of the nature of the scanning process. In addition, it is useful also for partially overcoming losses of vertical resolution caused by lenses of any optical apparatus employed in the system. Losses due to the employment of films also may be overcome at least partially.

It is to be understood that storage tubes of the types shown in Figures 4 and 5 are merely illustrative of apparatus capable of storing signal effects for substantial periods of time. These devices form no part of the present invention except as elements of the combinations by which the compensated signals are formed. Accordingly, it should be understood that they are not intended to be in any sense limiting. Those skilled in the art will understand that other types of devices may be used alternatively in systems of the character comprising this invention.

Also, it will be understood that the invention is not limited to systems in which subject representative signals are employed to produce visual effects in line interlaced fields. It is considered that whether or not interlacing is employed in the system is immaterial so far as this invention is concerned. Accordingly, except in those claims in which interlacing is specifically recited, it is to be understood that the subject matter defined applies equally well to non-interlace systems.

The nature of the invention may be determined from the foregoing disclosure of a number of illustrative embodiments thereof. The scope of the invention is defined in the following claims.

What is claimed is:

1. In a television system including a source of video signals and in which said video signals are to be impressed upon an image reproducing device in successive fields having interlaced parallel lines, apparatus to compensate for effective aperture loss in a direction perpendicular to said lines, said apparatus comprising, first means coupled to said video signal source to delay said signals for a time substantially equal to that required to scan one-half line less than one field, second means coupled to said video signal source to delay said signals for a time substantially equal to that required to scan one-half line more than one field, and a signal mixer coupled to said video signal source and to said first and second signal delay means to combine both of said delayed signals and said undelayed signal in predetermined polarity and magnitude to produce a compensated video signal for impression upon said image-reproducing device.

2. In a television system including a source of video signals and in which said video signals are to be impressed upon an image-reproducing device in successive fields having interlaced parallel lines, apparatus to compensate for effective aperture loss in a direction perpendicular to said lines, said apparatus comprising, first means coupled to said video signal source to delay said signals for a time substantially equal to that required to scan one-half line less than one field, second means coupled to said video signal source to delay said signals for a time substantially equal to that required to scan one-half line more than one field, means coupled to said delay means for reversing the polarity of both of said delayed signals relative to said undelayed signal, and a signal mixer coupled to said video signal source and to said polarity reversing means to combine both of said delayed signals of reversed polarity and said undelayed signal in predetermined respective magnitudes to produce a compensated video signal for impression upon said image-reproducing device.

3. In a television system including a source of video signals and in which said video signals are to be impressed upon an image-reproducing device in successive fields having interlaced parallel lines, apparatus to compensate for effective aperture loss in a direction perpendicular to said lines, said apparatus comprising, first means coupled to said video signal source to delay said signals for a time substantially equal to that required to scan one-half line less than one field, second means coupled to said video signal source to delay said signals for a time substantially equal to that required to scan one-half line more than one field, means coupled to said delay means for reversing the polarity of both of said delayed signals relative to said undelayed signal, means coupled to said polarity reversing means for attenuating both of said delayed signals, and a signal mixer coupled to said video signal source and to said attenuating means to combine said delayed signals and said undelayed signal to produce a compensated video-signal for impression upon said image-reproducing device.

4. In a television system including a source of video signals and in which said video signals are to be impressed upon an image-reproducing device in successive fields having interlaced parallel lines, apparatus to compensate for effective aperture loss in a direction perpendicular to said lines, said apparatus comprising, first means coupled to said video signal source to delay said signals for a time substantially equal to that required to scan one-half line less than one field, second means coupled to said video signal source to delay said signals for a time substantially equal to that required to scan one-half line more than one field, means for attenuating and reversing the polarity of both of said delayed signals, and means for combining said delayed signals and said undelayed signal to produce a compensated video signal for impression upon said image-reproducing device.

5. In a television system including a source of video signals and in which said video signals are to be employed to reproduce an image in successive fields having interlaced horizontal lines, apparatus to compensate for effective aperture loss in a vertical direction, said apparatus comprising, means including a signal storage device coupled to said video signal source to delay said signals for a time substantially equal to that required to scan one-half line less than one field, means coupled to said signal storage device to delay said signals for an additional time substantially equal to that required to scan one line, means for reversing the polarity of and attenuating both of said delayed signals, and means for combining said delayed and undelayed signals to produce a compensated video signal for image reproduction.

6. In a television system including a source of video signals and in which said video signals are to be employed to reproduce an image in successive fields having interlaced horizontal lines, apparatus to compensate for effective aperture loss in a vertical direction, said apparatus comprising, first means including a signal storage device coupled to said video signal source to delay said signals for a time substantially equal to that required to scan one-half line less than one field, second means including a signal storage device coupled to said video signal source to delay said signals for a time substantially equal to that required to scan one-half line more than one field, and means for combining said delayed signals with undelayed signals derived from said source in predetermined polarity and magnitude to produce a compensated video signal for image reproduction.

7. In a television system including a source of video signals and in which said video signals are to be employed to reproduce an image in successive fields having interlaced horizontal lines, apparatus to compensate for effective aperture loss in a vertical direction, said apparatus comprising, first means including a signal storage device coupled to said video signal source to delay said signals for a time substantially equal to that required to scan one-half line less than one field, second means including a signal storage device to delay said signals for a time substantially equal to that required to scan one-half line more than one field, at least one of said signal storage devices including a cathode ray tube having a signal storage electrode, electron beam means for storing signals derived from said source during a writing period and for deriving said stored signals from said electrode during a reading period, and means for combining said delayed signals with undelayed signals derived from said source in predetermined polarity and magnitude to produce a compensated video signal for image reproduction.

8. Video signal compensating apparatus as defined in claim 7, wherein said electron beam means includes a first electron gun for developing a writing electron beam, and a second electron gun for developing a reading electron beam.

9. Video signal compensating apparatus as defined in claim 8, wherein said electron guns are located on opposite sides of said signal storage electrode.

10. Video signal compensating apparatus as defined in claim 7, wherein said electron beam means includes a single electron gun for developing alternately writing and reading electron beams.

11. In a television system including a source of subject-representative signals and in which said signals are to be impressed upon an image-reproducing device operated in a manner to form an image raster of substantially parallel lines, apparatus to compensate for effective aperture loss in a direction substantially perpendicular to said lines, said apparatus comprising, means coupled to said signal source to delay said signals for a time substantially equal to the time elapsing between the scanning of a point in one of said raster lines and a substantially corresponding point in an immediately adjacent line, and a signal mixer coupled to said signal source and to said signal delay means to combine said delayed and undelayed signals in predetermined polarity and magnitude to produce a compensated subject-representative signal for impression upon said reproducing device.

12. In a television system including a source of subject-representative signals and in which said signals are to be impressed upon an image-reproducing device operated in a manner to form an image raster of substantially parallel lines, apparatus to compensate for effective aperture loss in a direction substantially perpendicular to said lines, said apparatus comprising, means coupled to said signal source to delay said signals for a time substantially equal to the time elapsing between the scanning of a point in one of said raster lines and a substantially corresponding point in the preceding adjacent line, and a signal mixer coupled to said signal source and to said signal delay means to combine said delayed and undelayed signals in predetermined polarity and magnitude to produce a compensated subject-representative signal for impression upon said reproducing device.

13. In a television system including a source of subject-representative signals and in which said signals are to be impressed upon an image-reproducing device operated in a manner to form an image raster of substantially parallel lines, apparatus to compensate for effective aperture loss in a direction substantially perpendicular to said lines, said apparatus comprising, means coupled to said signal source to delay said signals for a time substantially equal to the time elapsing between the scanning of a point in one of said raster lines and a substantially corresponding point in the immediately succeeding adjacent line, and a signal mixer coupled to said signal source and to said signal delay means to combine said delayed and undelayed signals in predetermined polarity and magnitude to produce a compensated subject-representative signal for impression upon said reproducing device.

14. In a television system including a source of subject-representative signals and in which said signals are to be impressed upon an image reproducing device operated in a manner to form an image raster of substantially parallel lines, apparatus to compensate for effective aperture loss in a direction substantially perpendicular to said lines, said apparatus comprising, first means coupled to said signal source to delay said signals for a time substantially equal to the time elapsing between the scanning of a point in one of said raster lines and a substantially corresponding point in a predetermined one of the two immediately adjacent lines, second means coupled to said signal source to delay said signals for a time substantially equal to the time elapsing between the scanning of said point in said one raster line and a substantially corresponding point in the other of the two immediately adjacent lines, and a signal mixer coupled to said signal source and to said first and second signal delay means to combine both of said delayed signals and said undelayed signal in predetermined polarity and magnitude to produce a compensated subject-representative signal for impression upon said reproducing device.

15. In a signalling system, a source of a continuous train of signals, apparatus to delay each of said signals for substantially the same predetermined time, said apparatus comprising, two cathode ray tubes each having a signal storage electrode and means including an electron gun for scanning said electrode during alternating intervals with writing and reading electron beams, means including first circuit switching apparatus operative to couple said signal source alternately to said storage electrodes during the intervals in which the writing beams are developed in the respective tubes, a signal utilization circuit and means including second circuit switching apparatus operative to couple said utilization circuit alternately to said storage electrodes during the intervals in which the reading beams are developed in the respective tubes.

16. In a signalling system, a source of a continuous train of signals, apparatus to delay each of said signals for substantially the same predetermined time, said apparatus comprising, two cathode ray tubes each having a signal storage electrode and means including an electron gun for scanning said electrode in successive horizontal lines during alternating intervals with writing and reading electron beams, means altering the relative vertical positions of said writing and reading beams to control said signal delay time, means including first circuit switching apparatus operative to couple said signal source alternately to said storage electrodes during the intervals in which the writing beams are developed in the respective tubes, a signal utilization circuit and means including second circuit switching apparatus operative to couple said utilization circuit alternately to said storage electrodes during the intervals in which the reading beams are developed in the respective tubes.

17. In a signalling system, a source of a continuous train of signals, apparatus to delay each of said signals for substantially the same predetermined time, said apparatus comprising, two cathode ray tubes each having a signal storage electrode, an electron gun and apparatus including deflection systems for said respective tubes for scanning said electrode during alternating intervals with writing and reading electron beams, means including first circuit switching apparatus operative to couple said signal source alternately to said storage electrodes during the intervals in which the writing beams are developed in the respective tubes, a signal utilization circuit means including second circuit switching apparatus operative to couple said utilization circuit alternately to said storage electrodes during the intervals in which the reading beams are developed in the respective tubes, and means controlled synchronously with said scanning apparatus to operate said switching apparatus.

18. In apparatus to compensate for effective aperture loss in a vertical direction in a television system including a source of video signals by which to reproduce an image in successive fields having interlaced horizontal lines, means coupled to said video signal source to delay said signals for a time approximately equal to that required to scan one of said fields comprising, two cathode ray tubes each having a signal storage electrode, an electron gun to develop alternately writing and reading electron beams by which to scan said storage electrode in a predetermined pattern, and an electron-collecting output electrode, first switching means operative to couple said video signal source alternately to the respective storage electrodes of said cathode ray tubes, and second switching means operative to provide access alternately to the respective electron-collecting electrodes of said cathode ray tubes so that video signals are being impressed for storing upon one of said cathode ray tubes while delayed video signals are being derived from the other cathode ray tube.

19. In apparatus to compensate for effective aperture loss in a vertical direction in a television system including a source of video signals by which to reproduce an image in successive fields having interlaced horizontal lines, means coupled to said video signal source to delay said signals for a time approximately equal to that required to scan one of said fields comprising, two cathode ray tubes each having a signal storage electrode, an electron gun to develop alternately writing and reading electron beams by which to scan said storage electrode in a predetermined pattern, and an electron-collecting output electrode, first switching means coupling said video signal source alternately to the respective storage electrodes of said cathode ray tubes, second switching means coupling circuits providing access alternately to the respective electron-collecting electrodes of said cathode ray tubes, and timing voltage-developing means coupled to said first and second switching means to coordinate their operations so that video signals are being impressed for storing upon one of said cathode ray tubes while delayed video signals are being derived from the other cathode ray tube.

20. In apparatus to compensate for effective aperture loss in a vertical direction in a television system including a source of video signals by which to reproduce an image in successive fields having interlaced horizontal lines, means coupled to said video signal source to delay said signals for a time approximately equal to that required to scan one of said fields comprising, two cathode ray tubes each having a signal storage electrode, an electron gun to develop alternately writing and reading electron beams, a deflecting system operative to cause said beams to scan said storage electrode in a predetermined pattern, and an electron-collecting output electrode, first switching means coupling said video signal source alternately to the respective electron-collecting electrodes of said cathode ray tubes, second switching means coupling signal-deriving circuits alternately to the respective electron-collecting electrodes of said cathode ray tubes, timing voltage-developing means coupled to said first and second switching means to coordinate their operations so that video signals are being impressed for storing upon one of said cathode ray tubes while delayed video signals are being derived from the other cathode ray tube, and means coupling said timing voltage-generating means to said deflecting systems to shift the positions of the writing and reading electron beams in the respective scanned patterns.

21. In apparatus to compensate for effective aperture loss in a vertical direction in a television system including a source of video signals and utilization means for said video signals by which to reproduce an image in successive fields having interlaced horizontal lines, means coupled to said video signal source to delay said signals for a time approximately equal to that required to scan one of said fields comprising, two cathode ray tubes each having a signal storage electrode, an electron gun to develop alternately writing and reading electron beams, a system to deflect said beams horizontally and vertically so as to scan said storage electrode in a predetermined pattern, said deflecting system including horizontal and vertical sawtooth wave generators and an electron-collecting output electrode, first switching means coupling said video signal source alternately to the respective storage electrodes of said cathode ray tubes, second switching means coupling said utilization means alternately to the respective electron-collecting electrodes of said cathode ray tubes, timing wave-developing means coupled to said first and second switching means to coordinate their operations so that video signals are being impressed for storing upon one of said cathode ray tubes while delayed video signals are being derived from the other cathode ray tube, and means to combine said timing and vertical sawtooth waves for impression upon said deflecting systems to shift oppositely the vertical positions of said writing and reading electron beams in the respective scanned patterns by approximately one-half a line.

22. An arrangement for equalization in a vertical picture direction in an interlaced scanning system comprising a first delay means having a delay time of one television field time less one-half a line time, a second delay means having a delay time of one television line time in series with said first delay means, means for applying television signals as an input to said first delay means, means at the input to said first delay means for deriving a main signal corresponding to a particular element of the picture scene, two secondary taps connected, respectively, to the input and output of said second delay means for deriving signals corresponding to elements of the scanning lines of the preceding field on each side of said particular line, and means for combining the main signal and the secondary signals in a predetermined way to derive an equalized signal.

23. An arrangement for equalization in a vertical picture direction in an interlaced scanning system comprising a first delay time of one television field less one-half line time, a second delay line having a delay time of one television line time in series with said first delay line, means for applying television signals as an input to said first delay line, a main tap connected to the input of said first delay line for deriving a main signal corresponding to a particular line of the picture scene, two secondary taps connected, respectively, to the input and output of said second delay line for deriving signals corresponding to elements of the scanning lines of the preceding field on each side of said particular line, and means for combining the main signal and the secondary signals to derive an equalized signal.

24. In a television system including a source of subject-representative signals and in which said signals are to be impressed upon an image-reproducing device operated in a manner to form an image raster of substantially parallel lines, apparatus to compensate for effective aperture loss in a direction substantially perpendicular to said lines, said apparatus comprising means coupled to said signal source to delay said signals for a time substantially equal to the time elapsing between the scanning of a point in one of said raster lines and a substantially corresponding point in the immediately succeeding adjacent line and to delay said signals for a time substantially equal to the time elapsing between the scanning of a point in one of said raster lines and a substantially corresponding point in the line immediately succeeding said last-mentioned immediately succeeding adjacent line, and a signal mixer coupled to said source and to the signal delay means to combine said delayed and undelayed signals in predetermined polarity and magnitude to produce a compensated subject representative signal for impression upon said reproducing device.

25. In a television system including a source of subject-representative signals and in which said signals are to be impressed upon an image-reproducing device operated in a manner to form an image raster of substantially parallel lines, apparatus to compensate for effective aperture loss in a direction substantially perpendicular to said lines, said apparatus comprising, means coupled to said signal source to derive signals representative of the elements of a particular one of said raster lines, means coupled to said signal source to derive other signals representative of substantially corresponding elements of another one of said raster lines immediately adjacent to said particular raster line, and means for combining said derived signals in predetermined polarity and magnitude to produce a compensated subject-representative signal for impression upon said reproducing device.

26. In a television system including a source of subject-representative signals and in which said signals are to be impressed upon an image-reproducing device operated in a manner to form an image raster of substantially parallel lines, apparatus to compensate for effective aperture loss in a direction substantially perpendicular to said lines, said apparatus comprising, means coupled to said signal source to derive signals representative of the elements of a particular one of said raster lines, means coupled to said signal source to derive other signals representative of substantially corresponding elements of another one of said raster lines immediately adjacent to and preceding said particular raster line, and means for combining said derived signals in predetermined polarity and magnitude to produce a compensated subject-representative signal for impression upon said reproducing device.

27. In a television system including a source of subject-representative signals and in which said signals are to be impressed upon an image-reproducing device operated in a manner to form an image raster of substantially parallel lines, apparatus to compensate for effective aperture loss in a direction substantially perpendicular to said lines, said apparatus comprising, means coupled to said signal source to derive signals representative of the elements of a particular one of said raster lines, means coupled to said signal source to derive other signals representative of substantially corresponding elements of another one of said raster lines immediately adjacent to and succeeding said particular raster line, and means for combining said derived signals in predetermined polarity and magnitude to produce a compensated subject-representative signal for impression upon said reproducing device.

28. In a television system including a source of subject-representative signals and in which said signals are to be impressed upon an image-reproducing device operated in a manner to form an image raster of substantially parallel lines, apparatus to compensate for effective aperture loss in a direction substantially perpendicular to said lines, said apparatus comprising, means coupled to said signal source to derive signals representative of the elements of a particular one of said raster lines, means coupled to said signal source to derive other signals representative of substantially corresponding elements of another one of said raster lines immediately adjacent to and preceding said particular raster line, means coupled to said signal source to derive still other signals representative of substantially corresponding elements of still another one of said raster lines immediately adjacent to and succeeding said particular raster line, and means for combining said derived signals in predetermined polarity and magnitude to produce a compensated subject-representative signal for impression upon said reproducing device.

29. In a television system in which signals including information representative of a subject are produced by effectively scanning said subject in substantially parallel raster lines and in which said signals are impressed upon an image-reproducing device operated in a manner to form an image raster of substantially parallel lines, apparatus to compensate for effective aperture loss in a direction substantially perpendicular to said lines, said apparatus including: means for producing by scanning said raster lines first individual signal components representative of the brightness information of successively scanned picture areas in a given one of said raster lines and second individual signal components representative of the brightness information of successively scanned picture areas in a raster line adjacent to said given raster line; and means for effectively combining said first and second individual signal components in such polarity and magnitude as to produce a compensated subject representative signal for impression upon said reproducing device.

No references cited.